(12) United States Patent
Celi, Jr.

(10) Patent No.: US 8,295,615 B2
(45) Date of Patent: Oct. 23, 2012

(54) SELECTIVE COMPRESSION OF SYNCHRONIZED CONTENT BASED ON A CALCULATED COMPRESSION RATIO

(75) Inventor: Joseph Celi, Jr., Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 11/746,707

(22) Filed: May 10, 2007

(65) Prior Publication Data

US 2008/0279462 A1    Nov. 13, 2008

(51) Int. Cl.
*G06K 9/47*    (2006.01)

(52) U.S. Cl. ......................... 382/232; 709/247

(58) Field of Classification Search .................. 382/232
See application file for complete search history.

(56) References Cited

U.S. PATENT DOCUMENTS

| | | | |
|---|---|---|---|
| 6,741,747 B1 | 5/2004 | Burns et al. | |
| 7,009,533 B1 * | 3/2006 | Wegener | 341/76 |
| 2002/0103938 A1 * | 8/2002 | Brooks et al. | 709/247 |
| 2002/0161856 A1 * | 10/2002 | Pineau et al. | 709/219 |
| 2003/0058277 A1 * | 3/2003 | Bowman-Amuah | 345/765 |
| 2004/0057435 A1 * | 3/2004 | Ruyle et al. | 370/395.5 |
| 2004/0215669 A1 * | 10/2004 | Mettala et al. | 707/201 |

FOREIGN PATENT DOCUMENTS

| | | |
|---|---|---|
| EP | 1107610 A1 | 6/2001 |
| WO | WO0163772 A1 | 8/2001 |

OTHER PUBLICATIONS

MacKay, D.J.C., "Information Theory, Inference, and Learning Algorithms," Cambridge University Press, pp. 73-74, Sep. 2003.

* cited by examiner

*Primary Examiner* — Hadi Akhavannik
(74) *Attorney, Agent, or Firm* — Patents on Demand P.A.; Brian K. Buchheit; Scott M. Garrett

(57) ABSTRACT

The present invention discloses a system and method for synchronizing data between a first data store and a second data store. The system can include a synchronization component, a compression pre-processor, and a compression/decompression component. The synchronization component can automatically synchronize content between the first data store and the second data store. The compression pre-processor can determine a compression ratio for digital content before the digital content is compressed. The compression/decompression component can selectively compress digital content based upon the compression ratio determined by the compression pre-processor. The selectively compressed digital content can be automatically conveyed between the first data store and the second data store during synchronization operations involving the synchronization component. The compression/decompression component can automatically decompress received content that has been compressed. This decompression can occur automatically before adding the digital content to a content receiving data store.

20 Claims, 3 Drawing Sheets

Compression Ratio Table 300

| | Original Size | Compressed Size | Estimated CR | Actual CR | One pass (msecs) | Two pass (msecs) |
|---|---|---|---|---|---|---|
| Entry 310 | 1741 | 453 | 3.21 | 3.84 | 36 | 48 |
| | 1793 | 434 | 3.98 | 4.13 | 34 | 45 |
| | 2704 | 609 | 4.13 | 4.44 | 32 | 43 |
| | 3147 | 721 | 4.06 | 4.36 | 18 | 24 |
| | 4103 | 782 | 5.19 | 5.25 | 31 | 41 |
| | 4700 | 718 | 6.24 | 6.55 | 16 | 21 |
| | 15035 | 1253 | 10.59 | 12.00 | 49 | 65 |
| Entry 320 | 11993 | 1587 | 7.38 | 7.56 | 45 | 60 |
| | 20160 | 6946 | 2.69 | 2.90 | 109 | 145 |
| | 323914 | 321203 | -1 | 1.01 | 2218 | 32 |

SELECTIVE COMPRESSION OF SYNCHRONIZED CONTENT BASED ON A CALCULATED COMPRESSION RATIO

BACKGROUND

1. Field of the Invention

The present invention relates to the field of data compression and, more specifically, to selective compression of synchronized content based on a calculated compression ratio.

2. Description of the Related Art

Recently there has been an explosion of computing devices that operate on limited resources. One type of device is the mobile phone, which is becoming heavily used for many applications. Mobile phones are performing applications such as sending and receiving email, storing contact information, and document manipulation. As a portable work center, it is sometimes important that data on the mobile phone is synchronized to a central data store or to other peer devices. This synchronization can utilize an abundance of resources on a device such as a mobile phone. Synchronization can also require a significant amount of content to be conveyed over a network which can result in substantial network provider carrier fees.

One effort to reduce resource consumption, particularly data transmission bandwidth, is to compress the synchronized data. Most synchronized content can be compressed using either a lossy or lossless encoding, depending on the situation. Lossless compression can, in some cases, make the synchronized content much larger and result in wasted resources. Further, lossy compression can sometimes result in marginal size gains, yet still expend computing resources and degrade content quality. It would be beneficial to know prior to compression whether a favorable compression outcome can be expected, which no known synchronization system or method is presently capable of doing.

SUMMARY OF THE INVENTION

The present invention discloses a technique for selective compression of synchronized content based on a calculated compression ratio. Synchronized content can be processed by a compression pre-processor to obtain a threshold value for the synchronized content. The threshold value can be compared to a pre-existing threshold value or set of decision rules to determine if anticipated compression results are more valued than compression costs. In instances where compressed synchronized content benefits from compression as determined by programmatically defined criteria, the content can then be compressed in a second pass by a compression/decompression component.

The present invention can be implemented in accordance with numerous aspects consistent with the material presented herein. For example, one aspect of the present invention can include a system for synchronizing data between a first data store and a second data store. The system can include a synchronization component, a compression pre-processor, and a compression/decompression component. The synchronization component can automatically synchronize content between the first data store and the second data store. The compression pre-processor can determine a compression ratio for digital content before the digital content is compressed. The compression/decompression component can selectively compress digital content based upon the compression ratio determined by the compression pre-processor. The selectively compressed digital content can be automatically conveyed between the first data store and the second data store during synchronization operations involving the synchronization component. The compression/decompression component can automatically decompress received content that has been compressed. This decompression can occur automatically before adding the digital content to a content receiving data store.

Another aspect of the present invention can include a method for synchronizing data. In the method, a synchronization action can be initialized between two data stores. Digital content that is to be conveyed from one of the data stores to another can be determined. A pre-processing compression algorithm can be used to determine a compression ratio for the digital content when processed by a related compression algorithm. When a set of programmatic actions determine that the compression ratio is sufficiently beneficial to merit compression, a compression algorithm can be executed to compress the digital content. Then, the digital content can be conveyed in the compressed format as part of the synchronization action from one data store to another. Once conveyed, the digital content can be automatically decompressed. When the set of programmatic actions determine that the compression ratio is not sufficiently beneficial to merit compression, uncompressed digital content can be conveyed as part of the synchronization action from one data store to another.

Still another aspect of the present invention can include a method to selectively compress digital content. The method can include a step of determining digital content to convey from one computing device to another. A pre-processing compression pass can be executed to determine a compression ratio of yet to be compressed digital content. The compression ratio can be compared against at least one previously established compression factor, which can be user configured. The digital content can be selectively compressed based upon results of the comparing step. A favorable comparison causes the content to be compressed and an unfavorable one causes the content to remain uncompressed. The selectively compressed content can then be conveyed from the one computing device to the other computing device.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
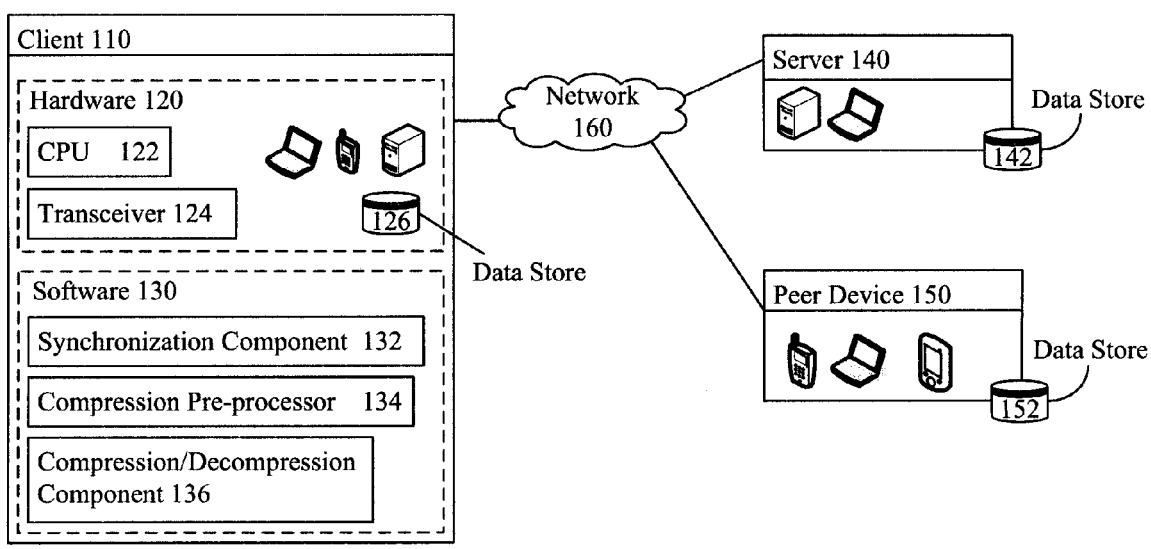
FIG. 1 is a schematic diagram illustrating a system for selective compression of synchronized content based on a calculated compression ratio in accordance with embodiments of the inventive arrangements herein.

FIG. 1 is a schematic diagram illustrating a system for selective compression of synchronized content based on a calculated compression ratio. In system 100, client 110 can synchronize content stored in a data store 126 using a combination of hardware 120 and software 130. Client 110 can synchronize content with server 140 or peer device 150.

Data store 126 can store synchronized content for use by client 110. The stored content can include email, Personal Information Manager (PIM) data, a set of files and documents, and the like. Data store 126 can be synchronized to data store 142 and 152, which are associated with server 140 and peer device 150, respectively.

Client 110 can contain hardware 120 and software 130 that can function to synchronize content with remote devices 140 and 150. Client 110 can be a mobile phone, laptop, portable multimedia device, a software device, any other computing device and the like. Client 110 can use hardware 120 and software 130 to compress content before synchronization occurs. Compression of synchronized content can conserve CPU 122 cycles, RAM memory and other computing resources. Transceiver 124 can be used to convey digital information such as synchronization messages and content between client 110 and a remote device 140, 150.

Synchronized content will often be compressed before transmission to a remote device to minimize a size of transferred data carried over network 160. Decreasing file size can lower a number of mis-transmission incidents and can decrease transmission costs. These gains can be offset by resource consumption from compression related delays and/or quality loss. Various user configurable compression/decompression algorithms can be used including, but not limited to a LZ77 algorithm, a Hoffman encoding algorithm, and the like.

Compression pre-processor 134 can determine if compressed synchronized content conserves resources of client 110 and network 160. Compression pre-processor 134 can generate data useful for use in compression such as a pattern dictionary. A pattern dictionary can be used by the compression/decompression component 136. The compression pre-processor 134 can relay pattern dictionary data to the compression/decompression component 136 for use in compressing synchronized content. Reuse of this pattern dictionary decreases time and processing resources needed for a compression pass. When synchronized content benefits from compression then the compressed synchronized content can be synchronized to a remote device.

In one embodiment synchronization component 132 can include synchronization markup language (SyncML) over the hypertext transfer protocol (HTTP). In this embodiment compression of synchronized content can be accomplished through use of the deflate compression scheme.

As shown herein, network 160 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 160 can include local components and data pathways necessary for communications to be exchanged among computing device components and between integrated device components and peripheral devices. The network 160 can also include network equipment, such as routers, data lines, hubs, and intermediary servers which together form a packet-based network, such as the Internet or an intranet. The network 160 can further include circuit-based communication components and mobile communication components, such as telephony switches, modems, cellular communication towers, and the like. The network 160 can include line based and/or wireless communication pathways.

Data stores 126, 142, and 152 can be physically implemented within any type of hardware including, but not limited to, a magnetic disk, an optical disk, a semiconductor memory, a digitally encoded plastic memory, a holographic memory, or any other recording medium. Each of the data stores 126, 142, and 152 can be stand-alone storage units as well as a storage unit formed from a plurality of physical devices, which may be remotely located from one another. Additionally, information can be stored within each data store 126, 142, and 152 in a variety of manners. For example, information can be stored within a database structure or can be stored within one or more files of a file storage system, where each file may or may not be indexed for information searching purposes.

Figures 2, 3:
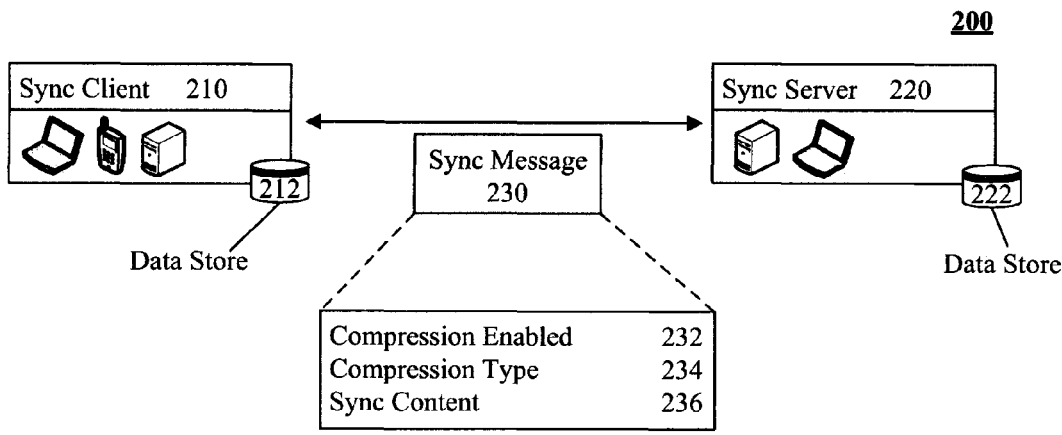
FIG. 2 is a schematic diagram illustrating a system for selective compression of synchronized content based on a calculated compression ratio in accordance with the embodiments of the inventive arrangements herein.
FIG. 3 is a table illustrating results of a calculated compression ratio for synchronized content in accordance with the embodiments of the inventive arrangements herein.

FIG. 2 is a schematic diagram illustrating a system 200 for selective compression of synchronized content based on a calculated compression ratio. System 200 can be employed in an embodiment of the inventive arrangements disclosed herein. System 200 illustrates a synchronization process between a synchronization client 210 and a synchronization server 220. Synchronization client 210 can synchronize content stored in data store 212 with a data store 222 located in remote device synchronization server 220.

Client 210 can compress synchronized content 236 before transmission. In one embodiment a configurable compression threshold can be used to determine if compression of synchronized content is favorable. Compression pre-processor 134 in system 100, can compress synchronized content to determine a ratio between the original synchronized content and the compressed version of the synchronized content. If this ratio exceeds a predetermined compression threshold value, the synchronized content can be compressed. In the instance in which compression of synchronized content is beneficial, compression can be performed on the synchronized content. The compressed synchronized content can be transmitted via sync message 230. In one embodiment, the message 230 can be encoded in a markup language (e.g., XML) that permits standards-based communications that conform within standard protocols.

A determination of whether it is situationally beneficial to compress content can be based upon any programmatically determinable set of rules and factors. These rules and factors, such as a compression threshold, can be user configurable, these factors and rules can change based on dynamic, as well as static factors, such as load on client 210 or performance constraints. Different factors can be used depending upon whether compression is lossless or lossy. In one embodiment, different compression algorithms can be utilized for the sync message 230, which are able to be automatically and selectively determined based upon configurable factors and rules.

Synchronization message 230 can be used to enable content to be synchronized to a remote device. Synchronization message 230 can contain a compression enabled 232 indicator, compression type 234 indicator and synchronized content 236. Compression enabled 232 indicator can show if compression is enabled in synchronization message 230. Compression type 234 indicator can denote the type of compression, if any, that is being employed. Synchronized content 236 can be compressed or uncompressed synchronized content. The indicators within the synchronization message 230 can be used by a message 230 receiving device to determine whether the message 230 requires decoding and to determine decoding specifics.

FIG. 3 is a table illustrating results of a calculated compression ratio for synchronized content in accordance with the embodiments of the inventive arrangements herein. Table 300 presents a result set of compression performed on synchronization data.

In compression ratio table 300, entry 310 and 320 illustrate two contrasting results of compressing synchronized content. In entry 310, the original size of the synchronized content can be larger than the compressed synchronized content as illustrated by values 2704 and 609 respectively. In entry 310, the compression can reduce the size of the synchronized content The estimated compression ratio (Estimated CR) for entry 310 can be different than the actual compression ratio (Actual CR). The estimated compression ratio (Estimated CR) can be compared to a threshold value to determine if the results are similar. If the estimated compression ratio (Estimated CR) is larger than the threshold value, compression is favorable.

Entry 310 illustrates the time in milliseconds a compression pre-processor process can take. The last column in entry 310 illustrates the time in milliseconds a compression process can take after compression in a pre-processor has occurred. By contrast, entry 320 illustrates that a compression pre-processor can estimate a compression ratio which indicates synchronized content cannot be favorably compressed. Estimated compression ratio for entry 320 can be a negative value which can indicate compression is not beneficial. Actual compression ratio illustrated as value 101 can be less than the threshold value which denotes compression is not necessary.

Figure 4:
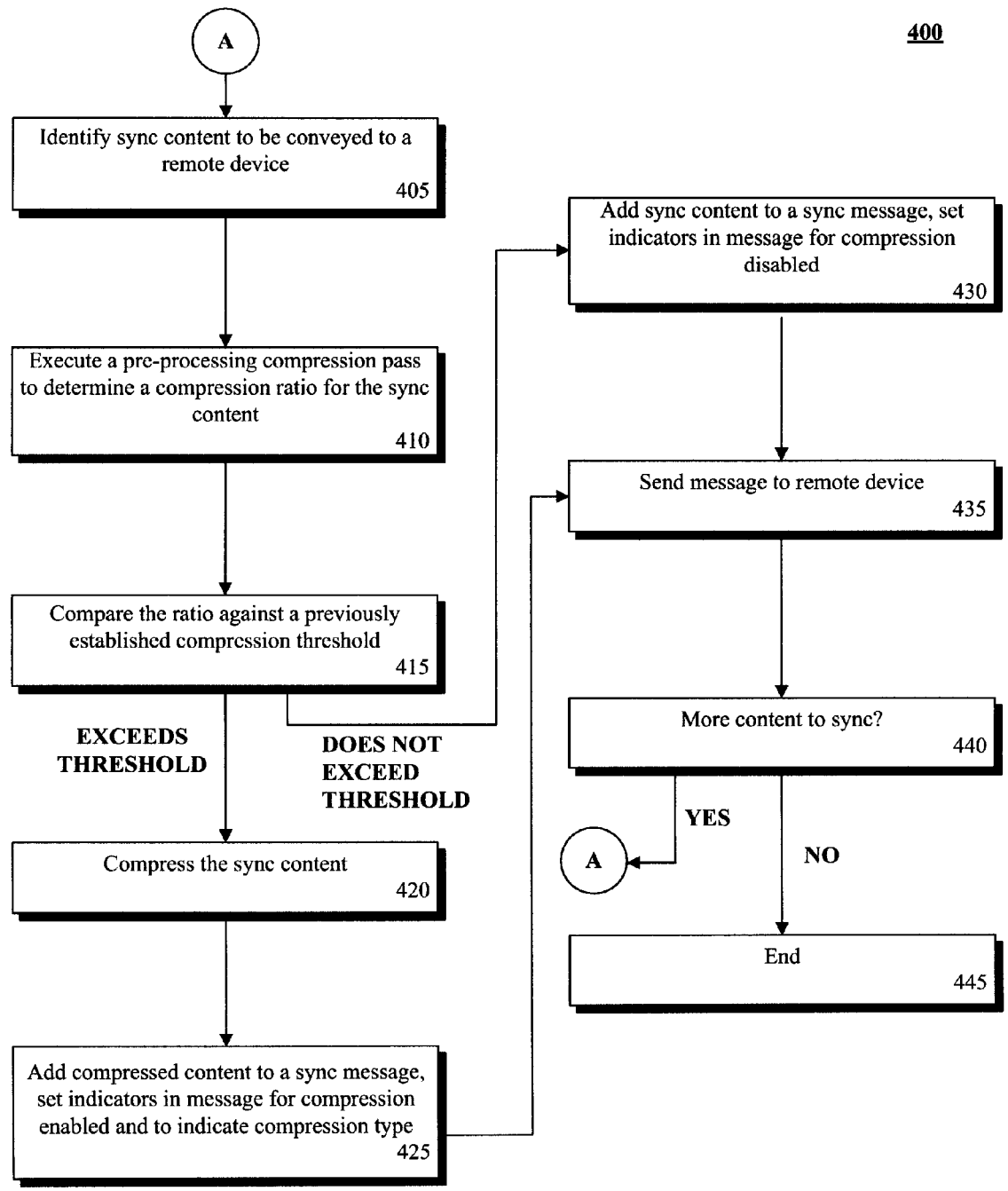
FIG. 4 is a flowchart illustrating the method for selective compression of synchronized content based on a calculated compression ratio in accordance with the embodiments of the inventive arrangements herein.

FIG. 4 is a flowchart illustrating the method 400 for selective compression of synchronized content based on a calculated compression ratio in accordance with the embodiments of the inventive arrangements herein. Method 400 can be performed in the context of system 100.

The method can begin in step 405 where synchronized content is identified to be conveyed to a remote device. A next step can be 410 to execute a pre-processing compression pass to determine a compression ratio for the synchronized content. The method can proceed to step 415 where comparison of the compression ratio against a previously established compression threshold is performed. If the compression ratio is lower than the compression threshold, the method can skip step 420 and step 425 and proceed to step 430. In step 430 the synchronized content can be added to a synchronization message that has compression indicators set to disabled. If the compression ratio is greater than the compression threshold the method can proceed to step 420. In step 420, the synchronized content can be compressed. In step 425, the compressed synchronized content can be added to a synchronization message that has the compression enabled and compression type indicators set.

The method then proceeds to step 435. In step 435, the synchronization message can be sent to a remote device. In step 440, a decision can be made if there is more content to be synchronized. If there is more content to be synchronized, the method can return to step 405 and begin again. If there is no more content to be synchronized the method can end in step 445.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following; a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for synchronizing data comprising:
   a first data store and a second data store which are remotely located from each other, at least one of the first and second data stores containing stored digital content;
   a synchronization component configured to automatically synchronize the digital content between the first data store and the second data store such that both the first and second data store contain the digital content;
   a compression pre-processor configured to determine a compression ratio for the digital content and compare the compression ratio with a preselected threshold, the compression ratio being a ratio of an uncompressed file size of the digital content and a compressed file size of the digital content, the preselected threshold indicating whether it is situationally beneficial to compress the digital content; and
   a compression/decompression component configured to selectively compress the digital content only when the estimated compression ratio determined by the compression pre-processor exceeds the preselected threshold, wherein the selectively compressed digital content is automatically conveyed between the first data store and the second data store during synchronization operations involving the synchronization component so that the digital content is stored at both the first and second data stores, and wherein the compression/decompression component automatically decompresses received compressed digital content before storing the digital content in a receiving one of the first data store and the second data store and wherein when the estimated compression ratio does not exceed the preselected threshold the digital content is transmitted without being compressed.

2. The system of claim 1, wherein the first data store is located in a client and the second data store is accessible from the client by a network.

3. The system of claim 1, wherein automatically synchronized content is conveyed between the first data store and the second data store within at least one hypertext transfer protocol (HTTP) based message.

4. The system of claim 3, wherein the HTTP based message conforms to a synchronization markup language that conforms to an open standard.

5. The system of claim 3, wherein the at least one HTTP based message includes selectively compressed digital content and a compression indicator that indicates whether the selectively compressed digital content has been compressed.

6. The system of claim 1, wherein the compression pre-processor and the compression/decompression component utilize a variant of a common compression algorithm, wherein the compression/decompression component utilizes a pattern dictionary during a compression pass that is generated by the pre-processor during a pre-processing pass.

7. A method for synchronizing data comprising:
    initializing a synchronization action between two remotely located data stores, at least one of the data stores having digital content stored therein;
    determining digital content to be conveyed from one of the data stores to another;
    executing a pre-processing compression algorithm to determine a compression ratio for the digital content when processed by a related compression algorithm, the compression ratio being a ratio of an uncompressed file size of the digital content and an compressed file size of the digital content;
    when a set of programmatic actions determine that the estimated compression ratio is sufficiently beneficial to merit compression as determined by comparing the compression ratio of the digital content to a preselected threshold, executing a compression algorithm to compress the digital content, conveying the digital content in the compressed format as part of the synchronization action form one data store to another, once conveyed automatically decompressing the digital content; and
    when the set of programmatic actions determine that the compression ratio is not sufficiently beneficial to merit compression when compared to the preselected threshold, conveying the uncompressed digital content as part of the synchronization action from one data store to another such that both data stores contain the digital content.

8. The method of claim 7, wherein the compression algorithm is a lossless compression algorithm, and wherein the set of programmatic actions specify that the determined compression ratio is sufficiently beneficial when a size of the compressed digital content as determined by the pre-processing compression algorithm is less than an uncompressed size of the digital content.

9. The method of claim 7, wherein conveyances of the digital content between the data stores uses at least one HTTP based message, wherein the HTTP based message comprises a compression indicator that indicates whether the digital content has been compressed and also comprises at least one of the compressed digital content and the uncompressed digital content.

10. The method of claim 7, wherein the pre-processing compression algorithm is a variant of the compression algorithm, wherein the pre-processing compression algorithm generates a pattern dictionary, which is used by the compression algorithm.

11. A method to selectively compress digital content comprising:
    determining digital content stored at one computing device to convey from the computing device to another computing device;
    executing a pre-processing compression pass of the digital content to determine a compression ratio of the digital content when compressed, the compression ratio being a ratio of an uncompressed file size of the digital content and an compressed file size of the digital content;
    comparing the compression ratio against at least one compression factor;
    selectively compressing the digital content based upon results of the comparing step where the digital content is compressed only when the compression ratio compares favorably with the at least one compression factor; and
    conveying the selectively compressed digital content from one computing device to the another computing device such that the digital content is stored at both computing devices, wherein the digital content is transmitted in compressed form when the compression ratio compares favorably with the at least one compression factor, and wherein the digital content is transmitted in uncompressed form when the compression ratio does not compare favorably with the at least one compression factor.

12. The method of claim 11, wherein the compression factor includes a compression ratio threshold, wherein the compressing step is performed only when the determined compression ratio favorably compares to the compression ratio threshold, said method further comprising:
    conveying the selectively compressed digital content from the one computing device to the another computing device via a sync message.

13. The method of claim 11, wherein both the one computing device and the another computing device automatically perform the determining, executing, comparing, and selectively compressing steps in order to exchange digital content, wherein upon receiving exchanged digital content a receiving device selectively decompresses the selectively compressed digital content.

14. The method of claim 13, wherein the determining, executing, comparing, and selectively compressing steps, as well as a selectively decompressing step, are automatically performed by at least one of the one computing device and the another computing device in a fashion transparent to a device user.

15. The method of claim 11, further comprising:
    conveying the selectively compressed digital content from the one computing device to the another computing device within a message conforming to a HTTP based protocol, wherein the conveyed message comprises a compression indicator of whether the digital content has been compressed;
    the another computing device receiving the selectively compressed digital content;
    the another computing device automatically determining whether the selectively compressed digital content has been compressed based upon a value of the compression indicator; and
    the another computing device selectively decompressing the digital content based upon results of the automatically determining step.

16. The method of claim 11, wherein the determining, executing, comparing, and selectively compressing steps are used for synchronizing content between a first data store associated with the one computing device and a second data store associated with the another computing device, wherein upon receiving exchanged digital content a receiving device automatically determines whether the digital content has been compressed and automatically decompresses compressed digital content.

17. The method of claim 16, wherein synchronizing content is programmatically performed in accordance with code stored upon a machine readable medium, said code being written in a synchronization markup language that conforms to an open standard.

18. The method of claim 16, wherein the selectively compressing step utilizes a modified variant of an algorithm used to compress the digital content in an event of a favorable comparison from the comparing step.

19. The method of claim 18, further comprising;
   determining that the compression ratio favorably compares against the at least one compression factor;
   generating a pattern dictionary during the pre-processing compression pass; and
   performing a compression pass to compress the digital content, wherein the compression pass utilizes the generated pattern dictionary.

20. The method of claim 11, wherein said steps of claim 11 are steps performed automatically by at least one machine in accordance with at least one computer program having a plurality of code sections that are executable by the at least one machine, said at least one computer program being stored in a machine readable memory.

* * * * *